United States Patent Office 3,795,642
Patented Mar. 5, 1974

---

3,795,642
TRIS(HYDROXYALKYL)-3,3,3-NITRILOTRI-PROPIONATES
Ben A. Tefertiller and James I. Nevill, Midland, Mich., assignors to The Dow Chemical Company, Midland, Mich.
No Drawing. Filed Oct. 24, 1972, Ser. No. 299,869
Int. Cl. C07c *101/20*
U.S. Cl. 260—482 P  9 Claims

ABSTRACT OF THE DISCLOSURE

Compounds having the structure

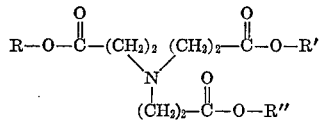

where R, R' and R" are monohydroxyalkyl groups of two to four carbon atoms, are prepared by reacting the corresponding monohydroxyalkyl acrylates with ammonia. The compounds may be used as cross-linking agents in polyurethanes and polyesters and for the removal of acid gases from gas streams.

SUMMARY OF THE INVENTION

The invention comprises the compounds of the formula

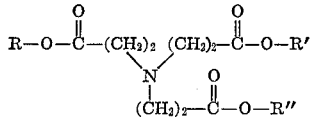

where R, R' and R" are monohydroxyalkyl groups of from two to four carbon atoms. The compounds of the above formula (hereinafter TNP's), are prepared by reacting ammonia with monohydroxyalkyl acrylates containing hydroxyalkyl groups of from two to four carbon atoms (hereinafter MHAA's), suitably in an organic solvent.

DETAILED DESCRIPTION OF THE INVENTION

The MHAA reactants employed in preparing the invention may be monohydroxyethyl acrylate, monohydroxypropyl or -isopropyl acrylate, monohydroxybutyl, -isobutyl or -sec. butyl acrylate or mixtures thereof.

The preparation of the TNP compounds may be conveniently carried out at atmospheric pressure and at a temperature of about 20°–100° C. The temperature is not a critical factor except that it should be maintained at a temperature which will avoid evaporative loss of the chosen solvent. Suitable solvents include the lower alcohols and ethers, benzene, toluene and dioxane.

In a preferred mode of practicing the invention, the reaction is conducted in a closed vessel at a pressure at least equal to the autogenous pressure of the reaction. The vessel may be a vertical packed tower into which the MHAA is fed at the top and the ammonia is fed near the bottom. The product TNP is then withdrawn from the bottom.

The above-described TNP compounds may be used as cross-linking polyol reactants in making polyurethanes or polyesters and as absorbents to remove acid gases such as HCl, H₂S or SO₂ from gas streams.

DESCRIPTION OF A SPECIFIC EMBODIMENT

The compound tris(hydroxyethyl)-3,3',3"-nitrilotripropionate, having the structure

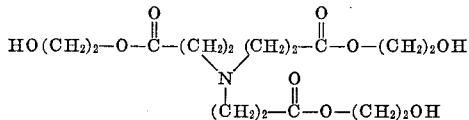

a colorless, odorless liquid with density of 1.2172 at 24° C., viscosity of 1960 cps. at 24° C., partially soluble in benzene or ether and completely soluble in water was prepared as a specific embodiment of the claimed tris(hydroxyalkyl)-3,3',3"-nitrilotripropionate.

The compound was prepared in a 500 ml. flask to which was added 100 ml. of 2B absolute ethyl alcohol and 58 grams of hydroxyethyl acrylate. Ammonia was bubbled in for one hour at 22–28° C. with stirring. The ammonia was shut off and stirring was continued one hour more. The alcohol and excess ammonia were removed by concentrating the solution on a rotary evaporator using vacuum; 61 grams (100% yield) of product was recovered. Infrared and nuclear magnetic resonance spectroscopy confirmed the identification of the product.

This product was combined with other conventional polyols and reacted with two different polyisocyanates to make cross-linked polyurethanes. Being a basic amine, it is also useful for scrubbing gas streams to remove acidic components such as HCl, H₂S or SO₂.

We claim:
1. The compound

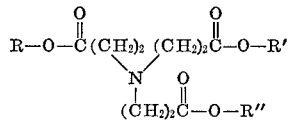

wherein R, R' and R" are monohydroxyalkyl groups of from two to four carbon atoms.
2. The compound of claim 1 wherein R, R' and R" each have the same number of carbon atoms.
3. The compound of claim 2 wherein R, R' and R" are unbranched monohydroxyalkyl chains.
4. The compound of claim 3 wherein R, R' and R" are monohydroxyethyl groups.
5. The compound of claim 3 wherein R, R' and R" are monohydroxypropyl groups.
6. The compound of claim 3 wherein R, R' and R" are monohydroxybutyl groups.
7. The compound of claim 2 wherein R, R' and R" are monohydroxyisopropyl groups.
8. The compound of claim 2 wherein R, R' and R" are monohydroxyisobutyl groups.
9. The compound of claim 2 wherein R, R' and R" are monohydroxy-sec. butyl groups.

References Cited
UNITED STATES PATENTS
3,278,478  10/1966  Masterson et al. ____ 260—482 P LORRAINE A. WEINBERGER, Primary Examiner P. J. KILLOS, Assistant Examiner U.S. Cl. X.R.
260—77.5 AM